(12) United States Patent
Hayashi et al.

(10) Patent No.: US 11,653,131 B2
(45) Date of Patent: May 16, 2023

(54) DISPLAY DEVICE AND SPEAKER FOR DISPLAY DEVICE

(71) Applicant: Funai Electric Co., Ltd., Osaka (JP)

(72) Inventors: Takumi Hayashi, Osaka (JP); Terutsugu Nakano, Osaka (JP); Kazuya Tanaka, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 178 days.

(21) Appl. No.: 17/329,715

(22) Filed: May 25, 2021

(65) Prior Publication Data

US 2021/0385563 A1    Dec. 9, 2021

(30) Foreign Application Priority Data

Jun. 5, 2020   (JP) ............... JP2020-098524

(51) Int. Cl.
*G02F 1/1333*   (2006.01)
*H04R 1/02*     (2006.01)

(52) U.S. Cl.
CPC ....... *H04R 1/028* (2013.01); *G02F 1/133314* (2021.01)

(58) Field of Classification Search
CPC ................................ G02F 1/133314
See application file for complete search history.

(56) References Cited

U.S. PATENT DOCUMENTS

| 10,492,006 B2 | 11/2019 | Nakamoto et al. | |
| 2018/0302700 A1* | 10/2018 | Je | H04R 1/028 |
| 2020/0213699 A1* | 7/2020 | You | H04R 17/00 |

FOREIGN PATENT DOCUMENTS

| JP | 2014-225749 A | 12/2014 |
| JP | 2018-148373 A | 9/2018 |
| WO | 2013/125815 A1 | 8/2013 |

OTHER PUBLICATIONS

The extended European search report for the corresponding European application No. 21176820.5 dated Nov. 3, 2021.

* cited by examiner

*Primary Examiner* — Edmond C Lau
(74) *Attorney, Agent, or Firm* — Global IP Counselors, LLP

(57) ABSTRACT

A display device comprises a display unit having a display surface, a light source that irradiates light onto the display unit, a rear housing attached to an opposite side of the display unit from the display surface, a rear cover that covers a part of the rear housing, and a speaker attached to the rear housing. The speaker includes a speaker main body, a first cover member to which the speaker main body is attached and having an outer surface facing the rear housing, a second cover member disposed so as to face the first cover member across the speaker main body, a retaining member disposed between the speaker main body and the first cover member and fixed to the rear housing by a fastening member, and a magnet attached to the outer surface of the first cover member and fixing the speaker main body to the rear housing.

20 Claims, 14 Drawing Sheets

MODIFICATION EXAMPLE

BEFORE MOVEMENT AFTER MOVEMENT

DISPLAY DEVICE AND SPEAKER FOR DISPLAY DEVICE

CROSS-REFERENCE TO RELATED APPLICATIONS

This application claims priority to Japanese Patent Application No. 2020-098524 filed on Jun. 5, 2020. The entire disclosure of Japanese Patent Application No. 2020-098524 is hereby incorporated herein by reference.

BACKGROUND

Field of the Invention

This invention generally relates to a display device and a speaker for a display device. More specifically, the present invention relates to a display device equipped with a speaker.

Background Information

Some display devices are equipped with a speaker (see Japanese Laid-Open Patent Application Publication No. 2018-148373 (Patent Literature 1), for example).

Patent Literature 1 above discloses a display device having a display unit, a front cover surrounding the display unit, a speaker, and a rear cover. In Patent Literature 1 above, the speaker is screwed to a rear of the front cover.

SUMMARY

Although not disclosed in Patent Literature 1 above, in recent thin display devices, the thickness from the front to the rear is small, and in particular, the thickness of the upper end side and the lower end side may be designed to be smaller than that of the center portion. This may cause the screw tips to contact the display unit when they are screwed into the display device, so it is conceivable to reduce the number of screw fixing points. However, reducing the number of screw fixing points reduces the force to fix the speaker and also causes the speaker to move due to vibration.

One object of the present disclosure is to provide a display device and a speaker for a display device that can reduce the number of screw fixing points and can firmly fix the speaker to the display device.

In view of the state of the known technology and in accordance with a first aspect of the present invention, a display device comprises a display unit having a display surface on which an image is displayed, a light source that irradiates light onto the display unit, a rear housing attached to an opposite side of the display unit from the display surface, a rear cover that covers a part of the rear housing, and a speaker attached to the rear housing, the speaker including a speaker main body, a first cover member to which the speaker main body is attached and having an outer surface facing the rear housing, a second cover member disposed so as to face the first cover member across the speaker main body, a retaining member disposed between the speaker main body and the first cover member and fixed to the rear housing by a fastening member, and a magnet attached to the outer surface of the first cover member and fixing the speaker main body to the rear housing.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Configuration of Liquid Crystal Television Device

Referring to FIGS. 1 to 12, the configuration of a liquid crystal television device 100 according to a first embodiment will be described. The liquid crystal television device 100 is an example of a "display device" of the claims.

Figure 1A:
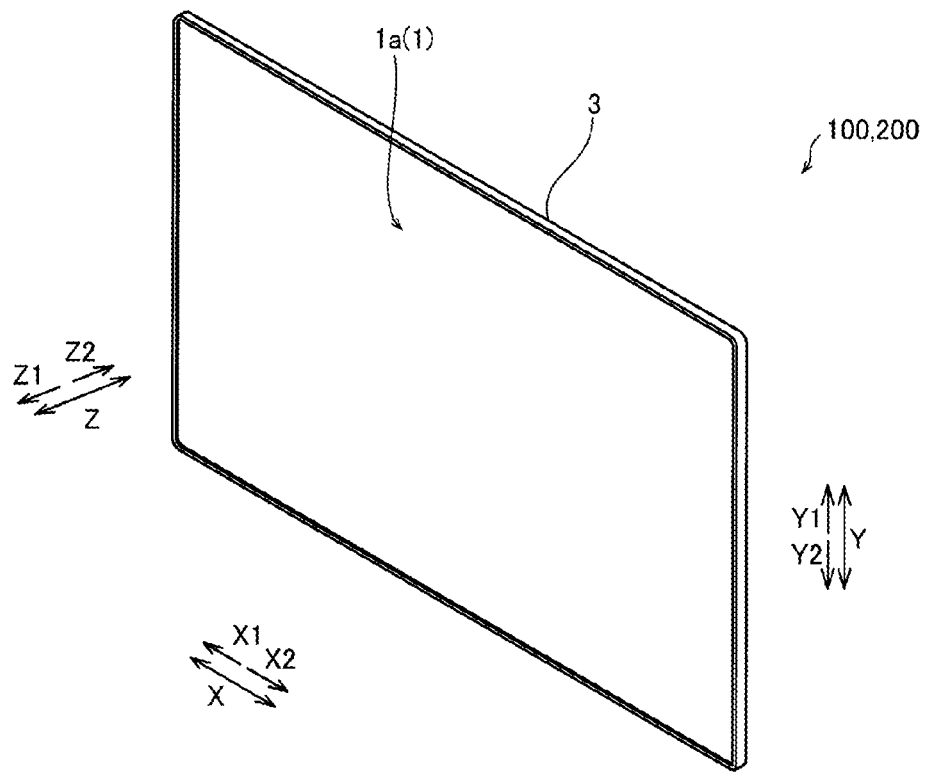
FIG. 1A is a front perspective view of a liquid crystal television device according to a first embodiment.
Figure 1B:
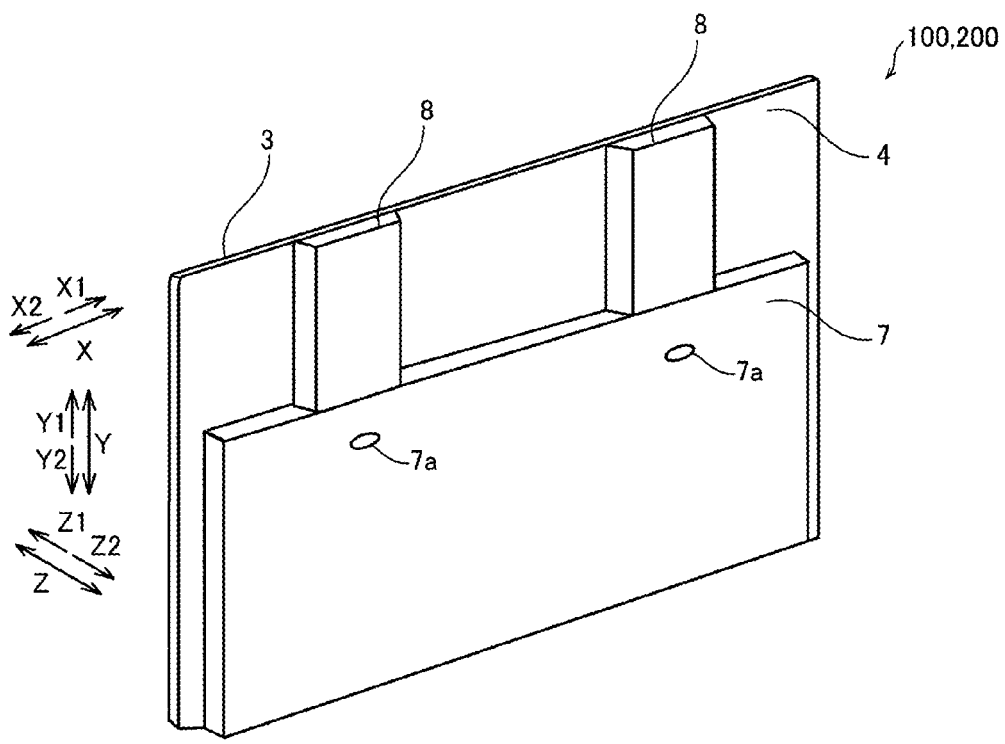
FIG. 1B is a rear perspective view of the liquid crystal television device.
Figure 2:
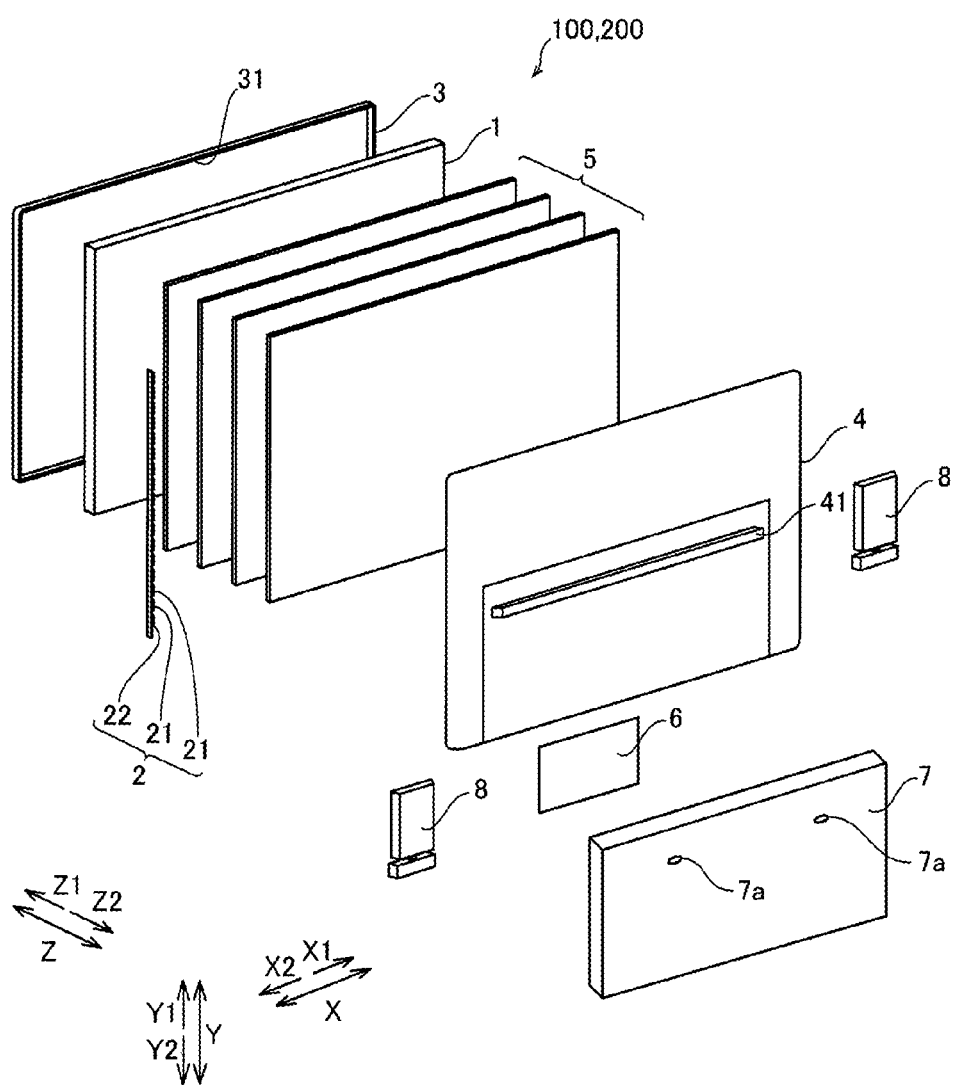
FIG. 2 is an exploded perspective view of the liquid crystal television device.

As shown in FIGS. 1 and 2, the liquid crystal television device 100 according to the first embodiment has a display unit or display 1, a light source 2, a front housing 3, a rear housing 4, a sheet member 5, a substrate 6, a rear cover 7, and a pair of speakers 8.

The display unit 1 includes a liquid crystal cell. The display unit 1 includes a plurality of pixels, and an image is displayed on a display surface 1a by changing the transmittance of light irradiated from the light source 2 by each of the plurality of pixels. The display unit 1 is driven based on video signals. The display unit 1 is rectangular in shape.

Here, the display surface 1a side is referred to as a front side (a Z1 side), and the opposite side of the Z1 side is referred to as a rear side (a Z2 side). The thickness direction of the display unit 1 connecting the front side and the rear side is referred to as a Z direction. The longer or longitudinal direction (the left-right direction) of the display unit 1 perpendicular to the Z direction is referred to as an X direction, and the shorter direction (the up-down direction) of the display unit 1 perpendicular to the Z direction is referred to as a Y direction. Of the X direction, the right side as viewed from the rear side to the front side is referred to as an X1 side, and the left side is referred to as a X2 side. Of the Y direction, an upper end side of the display unit 1 is referred to as a Y1 side, and a lower end side is referred to as a Y2 side.

As shown in FIG. 2, the light source 2 is disposed on the X2 side of the display unit 1. The light source 2 is configured to irradiate light to the display unit 1. The light source 2 includes a plurality of LEDs 21 and a light source substrate 22 on which the plurality of LEDs 21 are mounted.

The front housing 3 is made of resin. The length of the front housing 3 in the up-down direction (the Y direction) is larger than the length of the display unit 1 in the up-down direction (the Y direction). The length of the front housing 3 in the left-right direction (the X direction) is larger than the length of the display unit 1 in the left-right direction (the X direction). The front housing 3 supports the display unit 1 from the front side (the Z1 side). A rectangular opening 31 is provided in the center of the front housing 3 to expose the display surface 1a (see FIG. 1A) of the display unit 1 to the front side (the Z1 side).

As shown in FIG. 2, the rear housing 4 is made of sheet metal. The rear housing 4 is rectangular in shape. The rear housing 4 is attached to the front housing 3 from the rear side (the Z2 side) opposite to the display surface 1a (see FIG. 1A) of the display unit 1. The length of the rear housing 4 in the up-down direction (the Y direction) is smaller than the length of the front housing 3 in the up-down direction (the Y direction). Also, the length of the rear housing 4 in the left-right direction (the X direction) is smaller than the length of the front housing 3 in the left-right direction (the X direction). Therefore, the rear housing 4 is attached to the front housing 3 such that an outer peripheral surface of the rear housing 4 is fixed or fitted in contact with an inner peripheral surface of the front housing 3.

A beam portion 41 is provided on the rear side (the Z2 side) of the rear housing 4. The beam portion 41 is rectangular in shape. The beam portion 41 is provided on the rear side (the Z2 side) from the rear housing 4. The beam portion 41 may be integrally formed with the rear housing 4, or may be attached to the rear housing 4 as a separate independent member. In any case, the beam portion 41 is immovably and fixedly provided relative to the rear of the rear housing 4 such that the beam portion 41 protrudes in the Z direction relative to the rear of the rear housing 4. The beam portion 41 is made of sheet metal. The beam portion 41 is provided near the center of the rear housing 4 in the up-down direction (the Y direction). The beam portion 41 is formed so as to extend in the left-right direction (the X direction) of the rear housing 4. The beam portion 41 is provided to reinforce the strength of the rear housing 4.

The sheet member 5 is provided between the display unit 1 and the rear housing 4. The sheet member 5 includes a plurality of sheets. The sheet member 5 includes, for example, a reflective sheet or reflector that reflects light irradiated from the light source 2 and a diffusing sheet or diffuser that diffuses the irradiated light toward the display unit 1.

The substrate 6 is attached to the rear housing 4 from the rear side (the Z2 side). The substrate 6 is attached to a lower end side (the Y2 side) of the rear housing 4 than the center of the up-down direction (the Y direction). In the illustrated embodiment, the substrate 6 is disposed below the beam portion 41. The substrate 6 has a control circuit that is mounted thereon. The mounted control circuit of the substrate 6 is electrically connected to the display unit 1 and the speakers 8. The substrate 6 outputs audio signals to the speakers 8 and video signals to the display unit 1 by the control circuit.

The rear cover 7 is made of resin. For example, the rear cover 7 is made of polystyrene. The rear cover 7 has a rectangular shape. The length of the rear cover 7 in the up-down direction (the Y direction) is smaller than the length of the rear housing 4 in the up-down direction (the Y direction). The length of the rear cover 7 in the left-right direction (the X direction) is smaller than the length of the rear housing 4 in the left-right direction (the X direction). The rear cover 7 is attached to the lower end side (the Y2 side) of the rear housing 4 than the center of the rear housing 4 in the up-down direction (the Y direction). The rear cover 7 is attached to the rear housing 4 so as to cover the beam portion 41, a second portion 84b of a retaining member 84 of each of the speakers 8 (see FIG. 3) to be described later, and the substrate 6.

As shown in FIG. 1B, the speakers 8 are attached to the rear of the rear housing 4 such that one is disposed on the left side (the X2 side) and the other one is disposed on the right side (the X1 side) of the rear of the rear housing 4. In the first embodiment, the speakers 8 are attached to the rear housing 4 such that the position of an upper surface (a surface on the Y1 side) of each of the speakers 8 in the up-down direction (the Y direction) and the position of an upper surface (a surface on the Y1 side) of the liquid crystal television device 100 in the up-down direction (the Y direction) are disposed at the same position. The speakers 8 are attached to the upper end side (the Y1 side) of the rear housing 4 such that an outer or attachment surface 82a of a first cover member 82 of each of the speakers 8 faces the rear housing 4.

Figure 3:
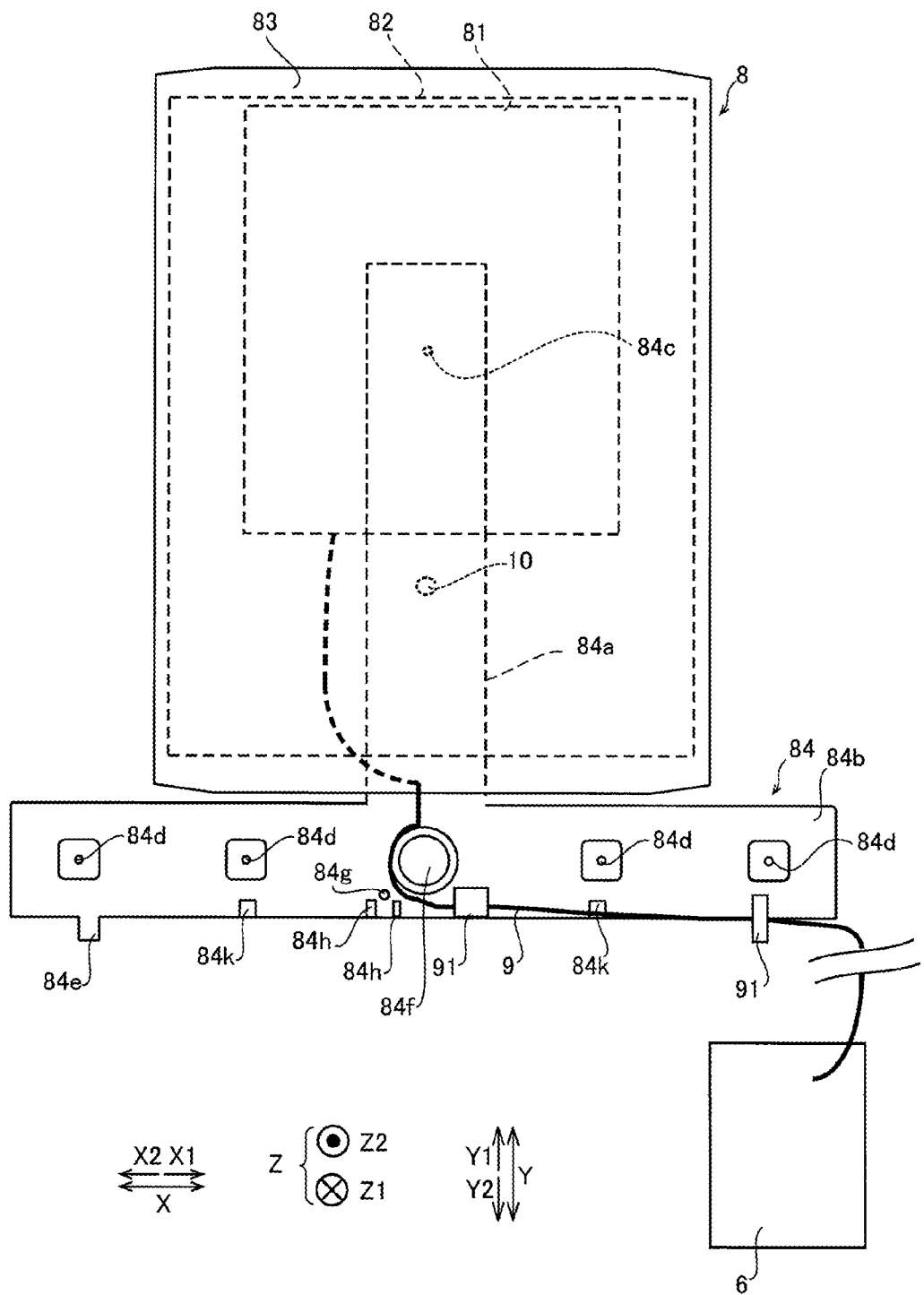
FIG. 3 is a diagram showing an internal structure of a speaker.

The configurations of the speakers 8 are basically identical or mirror symmetrical relative to each other, and thus the configuration of only one of the speakers 8 will be explained in detail for the sake of brevity. As shown in FIG. 3, the speaker 8 includes a speaker main body 81, the first cover member or front cover 82, a second cover member or rear cover 83, the retaining member or retainer 84, and a magnet 85 (see FIG. 4). FIG. 3 shows the speaker 8 as viewed from the rear side (the Z2 side), and the parts not visible from the outside are indicated by dashed lines. As shown in FIG. 5, the speaker 8 has a sound emission hole 87 covered by mesh on the upper surface (the Y1 side). Therefore, sound is output from the upper surface (the Y1 side). The speaker 8 is formed by attaching the retaining member 84, the speaker main body 81, and the second cover member 83 in this order to the first cover member 82. The magnet 85 is attached to the outer surface 82a of the first cover member 82 of the speaker 8. In the speaker 8, the first cover member 82 is located on the front side (the Z1 side) and the second cover member 83 is located on the rear side (the Z2 side).

As shown in FIG. 5, the speaker 8 is fixedly attached to the rear housing 4 with the first cover member 82 facing the rear housing 4. FIG. 5 shows a portion of the rear housing 4 to which the speaker 8 is attached. In FIG. 5, one of the two speakers is shown, but the other one is attached to the rear housing 4 in the same manner.

As shown in FIG. 3, the speaker main body 81 is electrically connected to the substrate 6 via a wiring 9. The speaker main body 81 amplifies the audio signals, converts the audio signals into sound, and outputs the sound. In FIG. 3, the wiring 9 is shown in a bold line.

Figure 6:
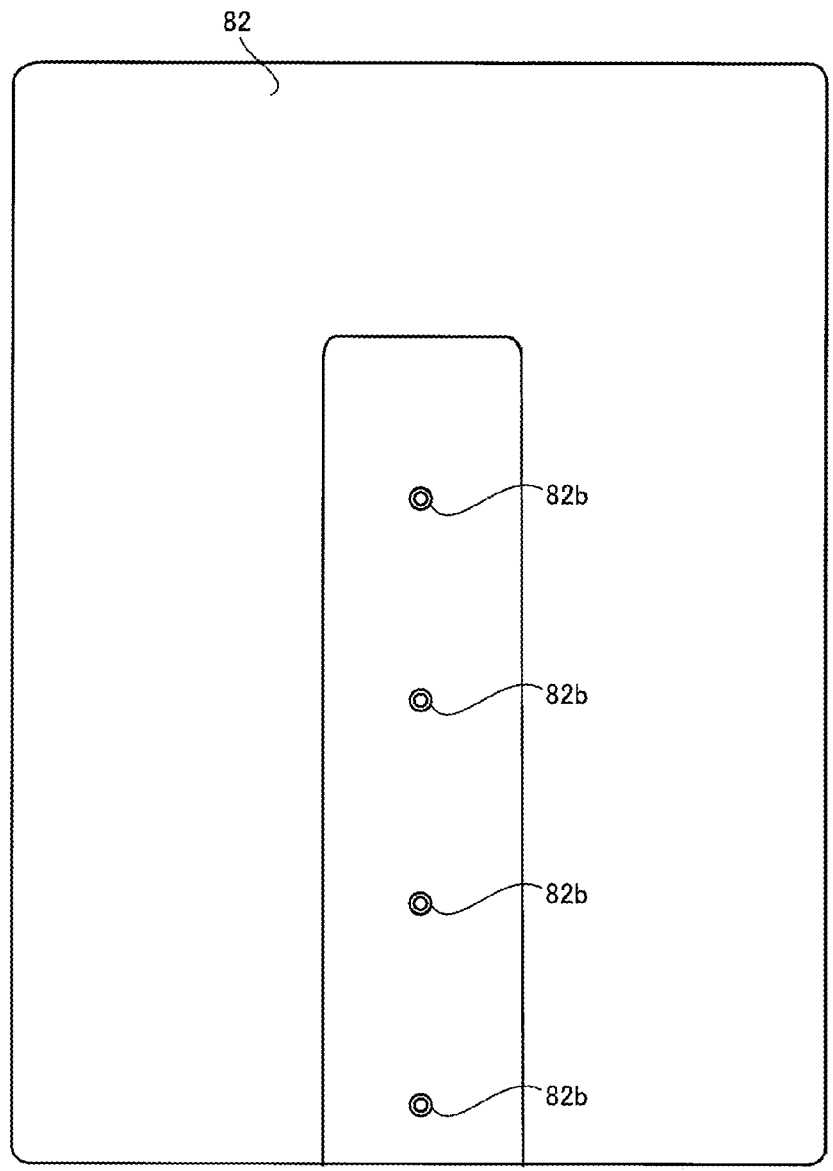
FIG. 6 is a front view of a first cover member of the speaker.
Figure 7:
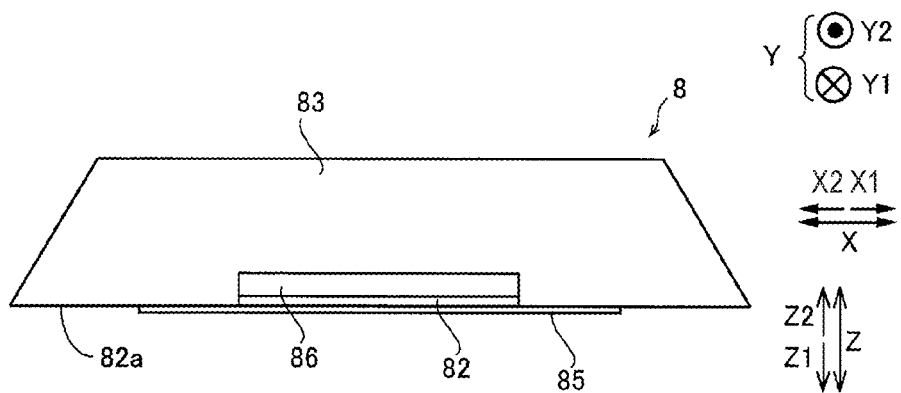
FIG. 7 is a bottom view of a state in which a second cover member of the speaker is attached to the first cover member.

As shown in FIGS. 3 and 6, the first cover member 82 is made of resin. The first cover member 82 is in the form of a flat plate. As shown in FIG. 6, a plurality of mounting portions 82*b* (at least one mounting portion) are provided on an inner surface (a surface on the Z2 side) of the first cover member 82 for attaching the retaining member 84 by the fastening members 10. The plurality of mounting portions 82*b* may be arranged at equal intervals or irregularly. The plurality of mounting portions 82*b* are arranged relative to each other along the Y direction.

Figure 4:
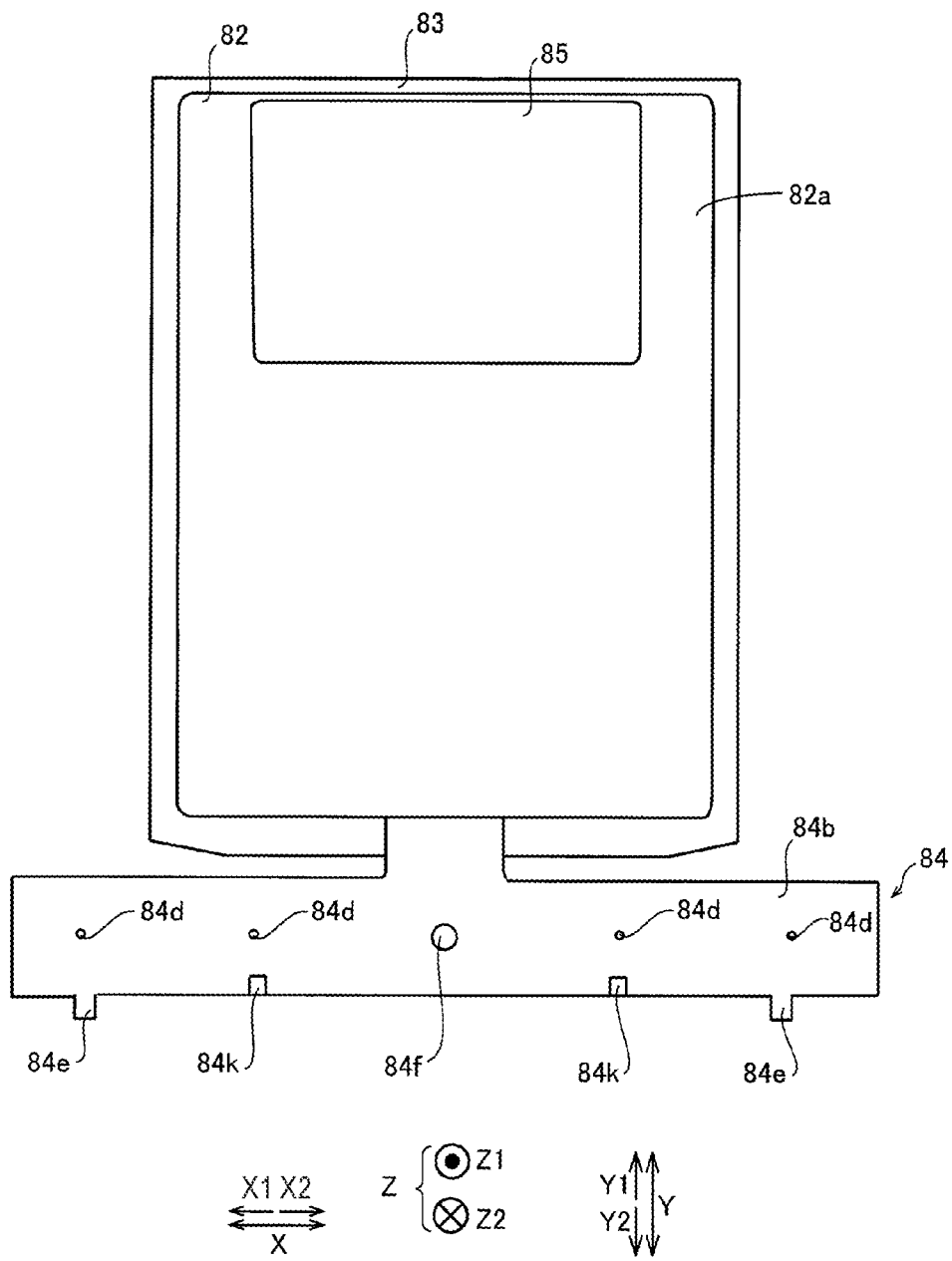
FIG. 4 is a diagram of the speaker as viewed from a front side.
Figure 5:
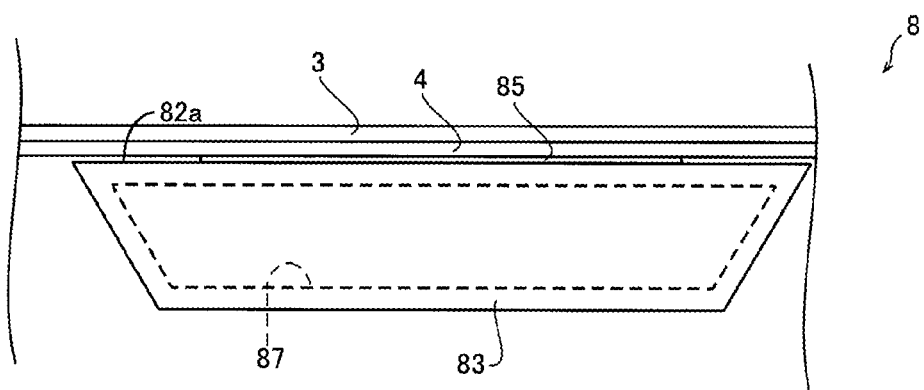
FIG. 5 is a plan view showing that the speaker attached to a rear housing of the liquid crystal television device.
Figure 5:
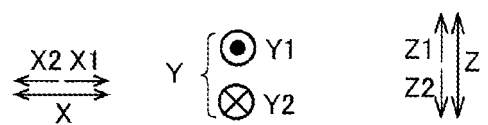

As shown in FIG. 4, the second cover member 83 is made of resin. The second cover member 83 is trapezoidal as viewed from the Y1 side (see FIG. 5). The length of the second cover member 83 in the up-down direction (the Y direction) is formed larger than the length of the first cover member 82 in the up-down direction (the Y direction). The length of the second cover member 83 in the left-right direction (the X direction) is formed larger than the length of the first cover member 82 in the left-right direction (the X direction). Also, the length (the thickness) of the second cover member 83 in the Z direction is formed larger than the length (the thickness) of the first cover member 82 in the Z direction. A surface of the second cover member 83 on the Z1 side has an opening portion. The first cover member 82 is attached to the opening portion of the surface of the second cover member 83 on the Z1 side. The first cover member 82 is attached to the second cover member 83 in a state in which an inner peripheral surface of the second cover member 83 on the Z1 side contacts an outer peripheral surface of the first cover member 82.

When the second cover member 83 is attached to the first cover member 82, as shown in FIG. 4, an opening 86 (see FIG. 7) is formed on the Y2 side of the second cover member 83 to expose a part of the retaining member 84 (the second portion 84*b*) to the outside.

Figure 8:
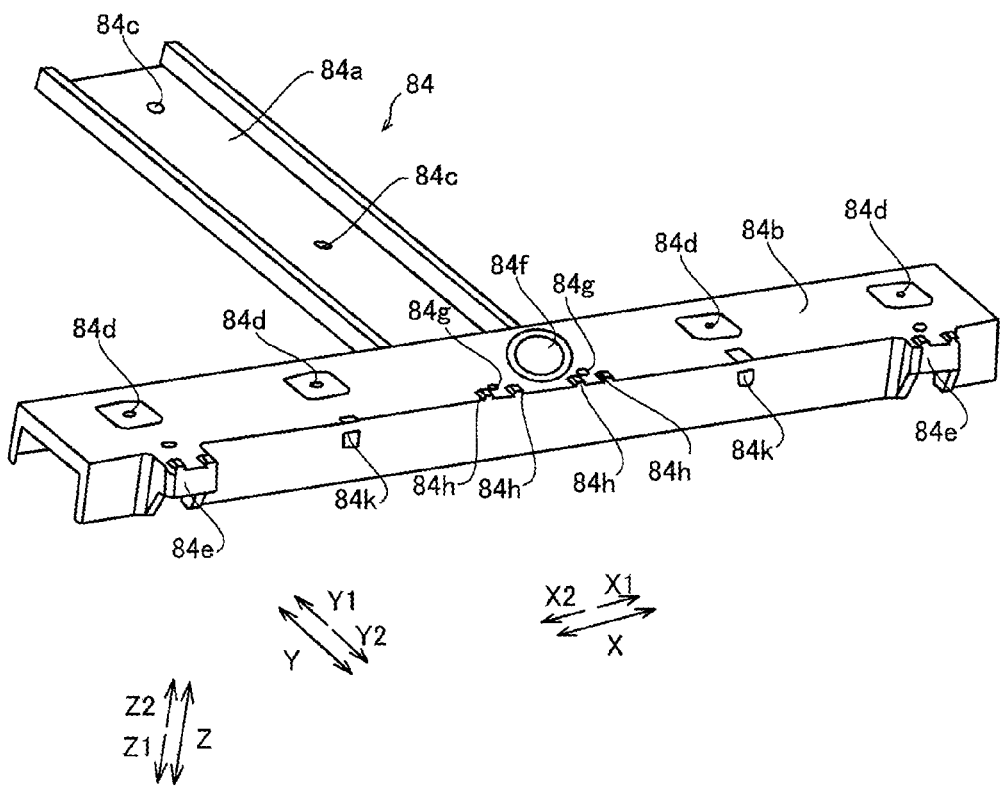
FIG. 8 is a perspective view of a retaining member of the speaker.

As shown in FIGS. 3 and 8, the retaining member 84 is made of a material having high strength such as resin and metal. For example, the retaining member 84 is made of die-cast or sheet metal. The retaining member 84 includes a first portion 84*a* that is attached to the first cover member 82 and a second portion 84*b* that is attached to the rear housing 4 (see FIG. 1B). The first portion 84*a* is formed in a straight shape so as to extend in the up-down direction (the Y direction). The second portion 84*b* is formed in a straight shape so as to extend in the left-right direction (the X direction). Therefore, the retaining member 84 is formed in a T-shape by the first portion 84*a* and the second portion 84*b*.

As shown in FIG. 8, the first portion 84*a* has a U-shape in a cross-sectional view taken along a direction (the X direction) perpendicular to a longer or longitudinal direction (the Y direction) of the first portion 84*a*. The first portion 84*a* is fixed to the first cover member 82 by the fastening members 10. The fastening members 10 are, for example, a screw. The first portion 84*a* is provided with a plurality of first holes 84*c* (e.g., at least one hole) for attaching the fastening members 10. The number of the first holes 84*c* are less than the number of the mounting portions 82*b* (see FIG. 6) provided on the first cover member 82. The first holes 84*c* may be arranged at equal intervals or irregularly. The first holes 84*c* are arranged relative to each other along the Y direction. The spacing of the first holes 84*c* is set in accordance with the spacing of the mounting portions 82*b* of the first cover member 82. The mounting portions 82*b* of the first cover member 82 are partially positioned relative to the first holes 84*c* of the first portion 84*a*. Specifically, in the illustrated embodiment, two of four mounting portions 82*b* of the first cover member 82 are aligned to the first holes 84*c* of the first portion 84*a* when the retaining member 84 is fixedly coupled to the first cover member 82. In a state in which the mounting portions 82*b* (see FIG. 6) of the first cover member 82 and the first holes 84*c* overlap with respect to each other, the first portion 84*a* of the retaining member 84 is fixed to the first cover member 82. Here, in the case of fixing with screws, screw holes are provided in either the mounting portions 82*b* of the first cover member 82 or the first portion 84*a* of the retaining member 84. By changing the combination of the positions of the mounting portions 82*b* and the positions of the first holes 84*c* to be fixed, the length of the speaker 8 from the upper end to the lower end in the up-down direction (the Y direction) can be changed. Specifically, the length of the speaker 8 measured from the upper surface of the second cover member 83 to a bottom surface of the retaining member 84 can be changed.

As shown in FIG. 8, the second portion 84*b* has a U-shape in a cross-sectional view taken along a direction (the Y direction) perpendicular to a longer or longitudinal direction (the X direction) of the second portion 84*b*. The second portion 84*b* is exposed from the lower end side (the Y2 side) of the first cover member 82 in a state in which the retaining member 84 is fixed to the first cover member 82.

Figure 9:
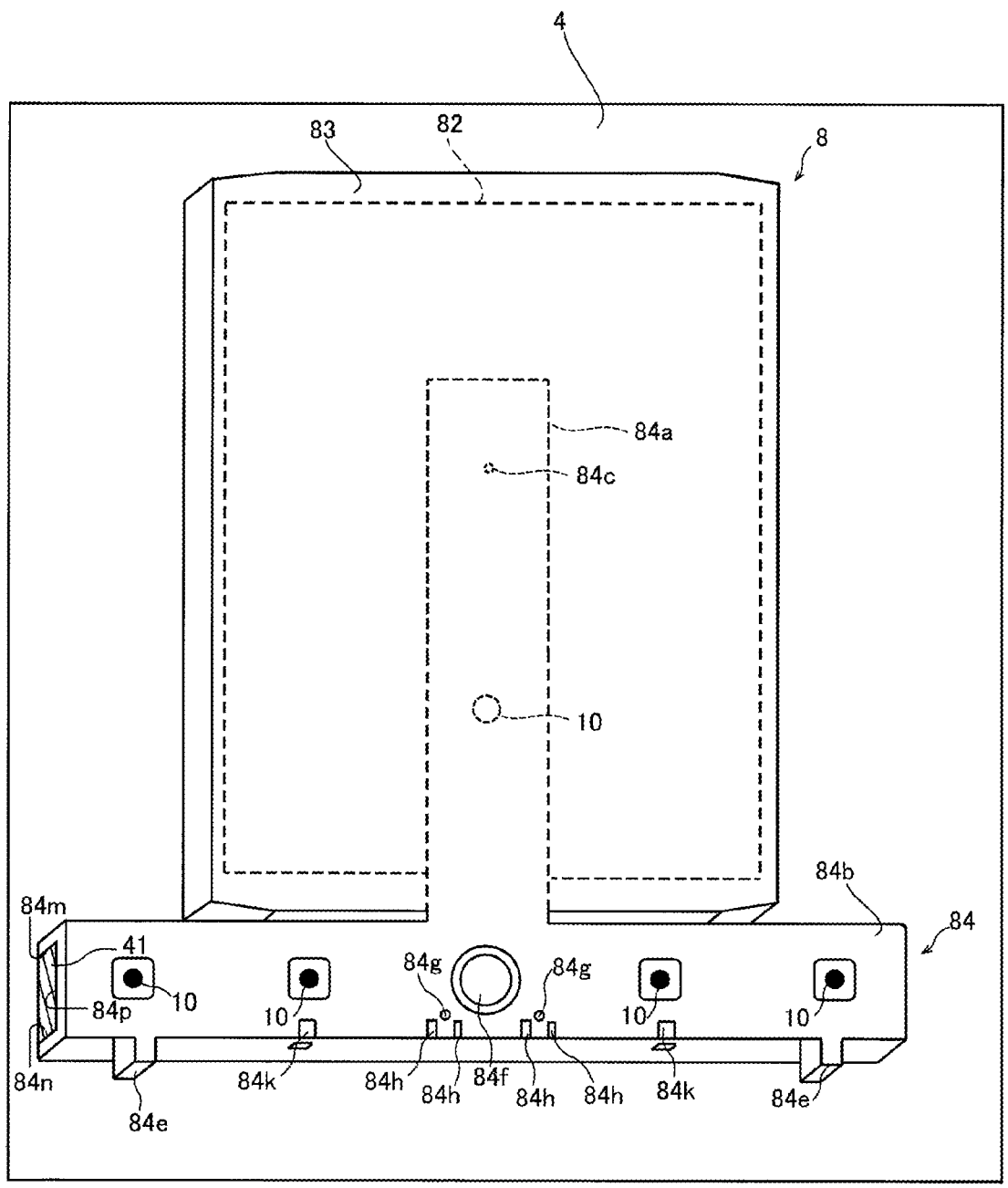
FIG. 9 is a schematic diagram showing a state in which the speaker is attached to the rear housing of the liquid crystal television device.
Figure 10:
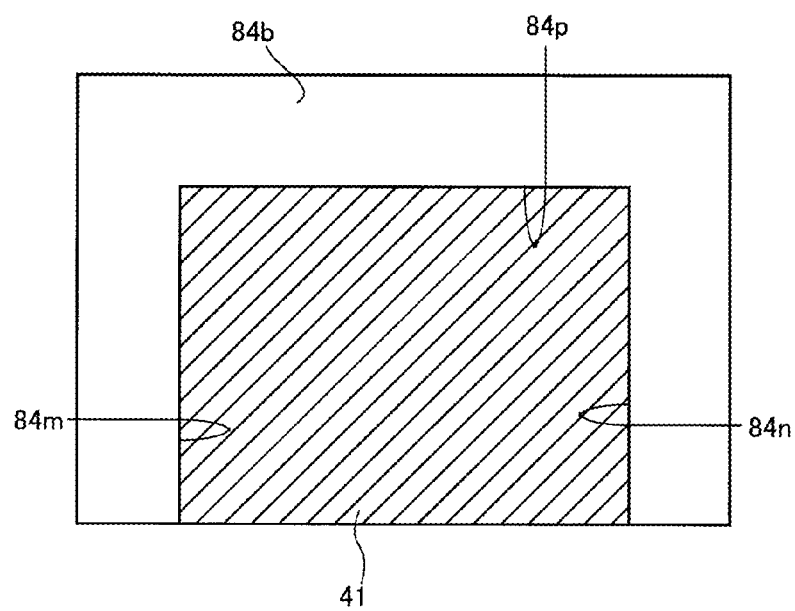
FIG. 10 is a schematic diagram showing a state in which a second portion of the retaining member is fixed to a beam portion of the liquid crystal television device.
Figure 10:
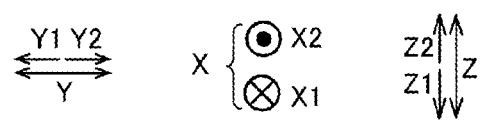

As shown in FIG. 9, the second portion 84*b* is fixed to the rear housing 4 by the fastening members 10 (see FIG. 9). In FIG. 9, only a part of the rear housing 4, to which the speaker 8 is attached, is shown. The second portion 84*b* has a plurality of second holes 84*d* for attaching the fastening members 10. The second portion 84*b* is covered by the rear cover 7 when it is attached to the rear housing 4 (see FIG. 1B). The second portion 84*b* is fixed to the beam portion 41 of the rear housing 4 so as to sandwich the beam portion 41 of the rear housing 4. Specifically, as shown in FIGS. 9 and 10, the second portion 84*b* has a U-shape with openings on surfaces on the X1 side, the X2 side, and the Z1 side in a cross-sectional view taken along the Y direction, and thus the beam portion 41 is sandwiched between a surface 84*m* on the Y1 side and a surface 84*n* on the Y2 side in the Y direction. In FIGS. 9 and 10, the beam portion 41 is shown by hatching. Here, the first portion 84*a* and the second portion 84*b* are integrated or fixedly coupled with respect each other. In particular, the first portion 84*a* and the second portion 84*b* are integrally formed as a one-piece, unitary member, or are independently formed as separate members that are fixedly coupled to each other.

As shown in FIG. 3, the second portion 84*b* has a plurality of wiring mounting portions 84*e* for fixing the wiring 9 connecting the substrate 6 and the speaker main body 81. Fasteners 91 for fixing the wiring 9 are attached to the wiring mounting portions 84*e*. The fasteners 91 are, for example, clips or cable ties. When a clip is attached to the wiring mounting portion 84*e*, the wiring mounting portion 84*e* is provided with a hole 84*g* for inserting the tip of the clip that bundles the wiring 9 and rotation stoppers 84*h* for preventing the clip from rotating. When a cable tie is attached to the wiring mounting portion 84*e*, the wiring mounting portion 84*e* is provided with a hole 84*k* for passing the cable tie therethrough. The wiring 9 connecting the substrate 6 and the speaker main body 81 is disposed between the first cover member 82 and the second cover member 83 and between the rear housing 4 and the rear cover 7 (see FIG. 1B). The wiring 9 is exposed to the outside from the first cover member 82 through the opening 86 (see FIG. 7) formed when the second cover member 83 is attached to the first cover member 82.

As shown in FIG. 9, the second portion 84b is provided with a mounting portion 84f for attaching the liquid crystal television device 100 (see FIG. 1B) to a wall surface. For example, the mounting portion 84f is a screw hole provided in the second portion 84b. By providing holes 7a (see FIG. 1B) in the corresponding positions of the rear cover 7 (see FIG. 1B), metal fittings for wall mounting can be attached to the mounting portions 84f of the second portions 84b of the speakers 8 through the rear cover 7. The metal fittings are, for example, screws.

As shown in FIG. 4, the magnet 85 is in the form of a sheet. The magnet 85 is attached to the outer surface 82a (a surface on the Z1 side) of the first cover member 82. For example, the magnet 85 is attached to the first cover member 82 using double-sided tape or adhesive. The position at which the magnet 85 is attached to the first cover member 82 is the upper end side (the Y1 side) of the speaker 8. More preferably, the position for attaching the magnet 85 is set such that the position at which the magnet 85 is attached to the first cover member 82 and the position at which the second portion 84b of the retaining member 84 is attached to the rear housing 4 are symmetrical with respect to the center of the speaker 8 in the up-down direction (the Z direction).

In the speaker 8 of the first embodiment, a plurality of second cover members 83 of different sizes (dimensions) are attachable to the first cover member 82. Therefore, by replacing the second cover member 83, the speaker 8 can be used for liquid crystal television devices 100 of different sizes. Here, an example will be explained in which the speaker 8 is used for a 55-inch liquid crystal television device 100 and a 65-inch liquid crystal television device 100 that have different sizes relative to each other. The combination of liquid crystal television devices 100 of different sizes is not limited to the combination of the 55-inch liquid crystal television device 100 and the 65-inch liquid crystal television device 100. For example, a combination of the 55-inch liquid crystal television device 100 and a 75-inch liquid crystal television device 100 may be used.

Figure 11:
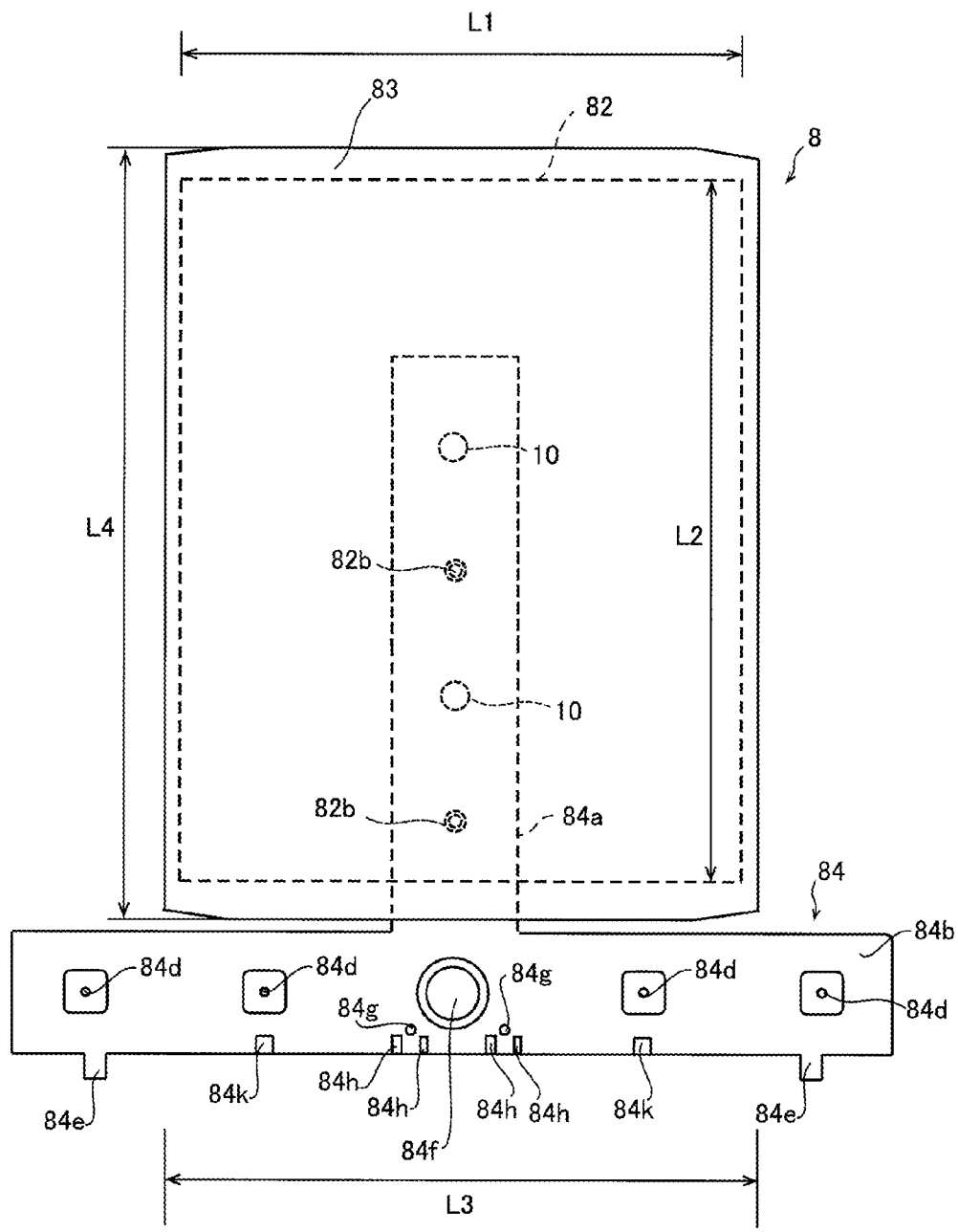
FIG. 11 is a schematic diagram of a speaker for a 55-inch liquid crystal television device.

Referring to FIG. 11, an example in which the speaker 8 is used in the 55-inch liquid crystal television device 100 will be described. When the speaker 8 is used for the 55-inch liquid crystal television device 100, the position for attaching the retaining member 84 to the first cover member 82 is adjusted such that the position of the upper surface (the surface on the Y1 side) of the speaker 8 in the up-down direction (the Y direction) is the same as the position of the upper surface (the surface on the Y1 side) of the liquid crystal television device 100. For example, the first and third holes counted from the Y1 side among the four mounting portions 82b provided in the first cover member 82 are selected (see FIG. 6). Here, the length of the first cover member 82 used for the 55-inch liquid crystal television device 100 in the left-right direction (the X direction) is referred to as L1, and the length in the up-down direction (the Y direction) is referred to as L2. The length of the second cover member 83 used for the 55-inch liquid crystal television device 100 in the left-right direction (the X direction) is referred to as L3, and the length in the up-down direction (the Y direction) is referred to as L4.

Figure 12:
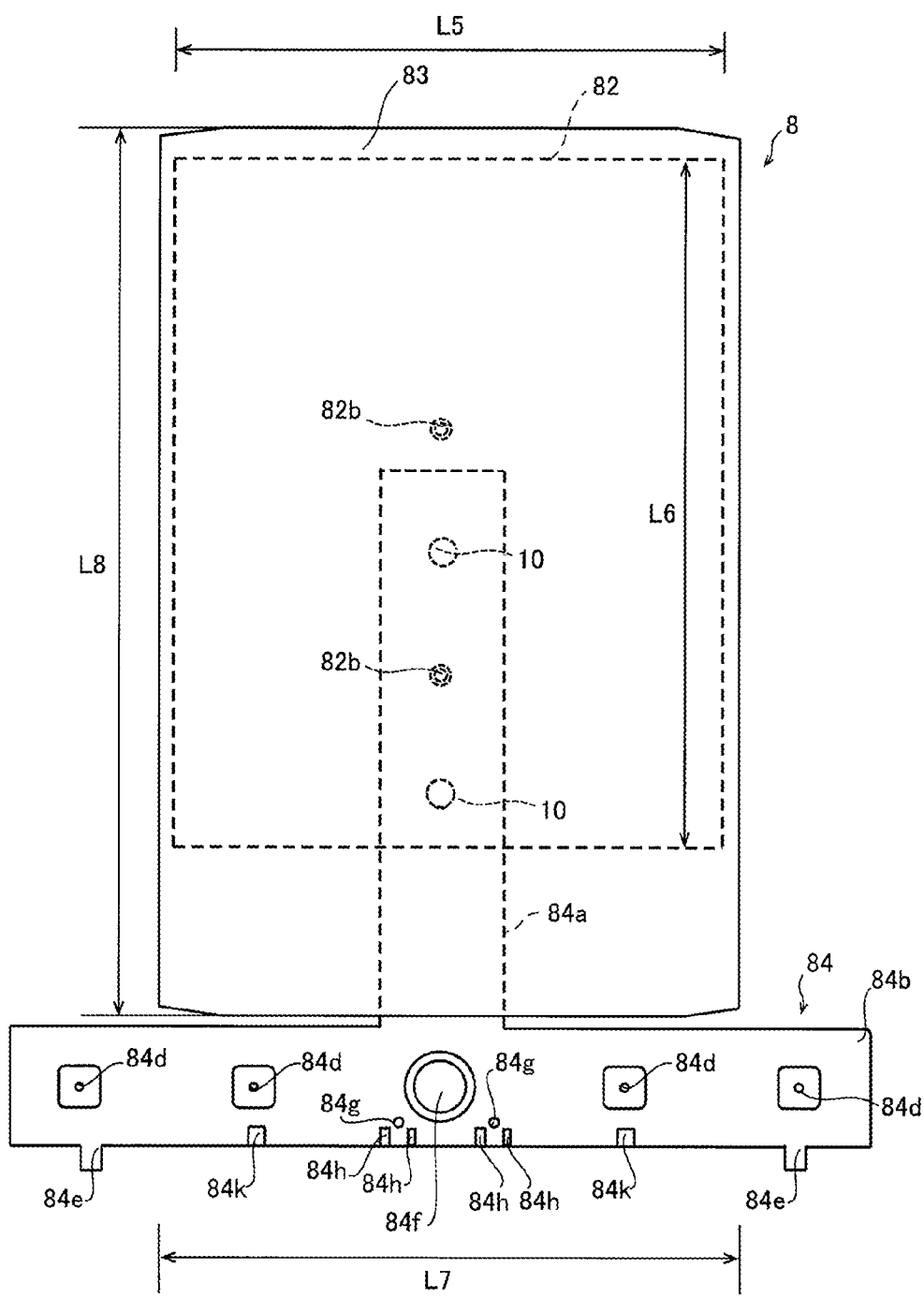
FIG. 12 is a schematic diagram of a speaker for a 65-inch liquid crystal television device.

Next, referring to FIG. 12, an example in which the speaker 8 is used in the 65-inch liquid crystal television device 100 is described. In the 65-inch liquid crystal television device 100, the first cover member 82 is used that has the length L5 in the left-right direction (the X direction) and the length L6 in the up-down direction (the Y direction) that are the same as the length L1 in the left-right direction and the length L2 in the up-down direction of first cover member 82 for the 55-inch liquid crystal television device 100. The length of the 65-inch liquid crystal television device 100 in the up-down direction (the Y direction) is larger than that of the 55-inch liquid crystal television device, and thus the length from the beam portion 41 provided in the center to the upper surface (the surface on the Y1 side) is larger in the 65-inch liquid crystal television device 100 than the 55-inch liquid crystal television device 100. Therefore, the position for attaching the retaining member 84 to the first cover member 82 is adjusted such that the position of the upper surface (the surface on the Y1 side) of the speaker 8 in the up-down direction (the Y direction) is the same as the position of the upper surface (the surface on the Y1 side) of the liquid crystal television device 100. Specifically, the second and fourth holes counted from the Y1 side among the four mounting portions 82b provided in the first cover member 82, unlike the 55-inch liquid crystal television device 100, are selected (see FIG. 6). With this configuration, the position for attaching the retaining member 84 to the first cover member 82 can be shifted to the Y2 side. Specifically, the entire length of the speaker 8 in the Y direction can be enlarged in the 65-inch liquid crystal television device 100 relative to the 55-inch liquid crystal television device 100.

In the 65-inch liquid crystal television device 100, the length L7 of the second cover member 83 in the left-right direction (the X direction) is the same as the length L3 of the second cover member 83 used for the 55-inch liquid crystal television device 100 in the left-right direction. On the other hand, in the 65-inch liquid crystal television device 100, the length L8 of the second cover member 83 in the up-down direction (the Y direction) is larger than the length L4 of the second cover member 83 used for the 55-inch liquid crystal television device 100 in the up-down direction. In this case, different second cover members 83 of different sizes are attachable to the first cover member 82 by setting the position for fixing the first cover member 82 to the second cover members 83 is fixed at a certain distance from the position of the upper end regardless of the length in the Y direction. By changing the position for attaching the retaining member 84 to the first cover member 82, the position of the upper surface (the surface on Y1 side) of the rear housing 4 in the up-down direction (the Y direction) and the position of the upper surface (the surface on the Y1 side) of the speaker 8 can be set to the same position. In addition, since the retaining member 84 can be prevented from being exposed on the rear side (the Z2 side) by changing the second cover member 83, the design as viewed from the rear side (the Z2 side) can be improved.

Effect of First Embodiment

In the first embodiment, the following effects can be obtained.

In the first embodiment, as described above, each of the speakers 8 includes the magnet 85 attached to the outer surface 82a of the first cover member 82 and fixing each of the speakers 8 to the rear housing 4. With this configuration, each of the speakers 8 can be fixed to the rear housing 4 of the liquid crystal television device 100 by the magnet 85, and thus number of screw fixing points can reduced compared to the case in which the speakers 8 are fixed only by screws, and each of the speakers 8 can also be fixed to the rear housing 4 by magnetic force. In addition, each of the speakers 8 includes the retaining member 84 that is fixed to the rear housing 4 by the fastening members 10. With this configuration, the speakers 8 can be fixed to the liquid crystal television device 100 by the fastening members 10 as well. As a result, it is possible to reduce the number of screw fixing points, and to firmly fix the speakers 8 to the liquid crystal television device 100.

In the first embodiment, the magnet 85 is disposed at the upper end side of each of the speakers 8 and fixed to the rear housing 4, and the retaining member 84 is exposed from the first cover member 82 at the lower end side of each of the speakers 8 and is fixed to the rear housing 4 by the fastening members 10. With this configuration, both the upper end side and the lower end side of each of the speakers 8 can be fixed to the rear housing 4 such that the upper end side of each of the speakers 8 is fixed to the rear housing 4 by the magnet 85 and the lower end side of each of the speakers 8 is fixed to the rear housing 4 by the retaining member 84, and thus, compared to the case in which only one of the upper end side and the lower end side is fixed, it is possible to suppress the vibration of the other one. As a result, it is possible to suppress the generation of noise (so-called "chatter") due to the vibration of the speakers 8.

In the first embodiment, the retaining member 84 has the first portion 84a that is attached to the first cover member 82 and the second portion 84b that is attached to the rear housing 4, and the second portion 84b is covered by the rear cover 7 while being attached to the rear housing 4. With this configuration, the second portion 84b is covered by the rear cover 7, and thus it is possible to prevent the fastening members 10 from being unintentionally loosened by external contact.

In the first embodiment, the first portion 84a of the retaining member 84 is configured to extend in the up-down direction of the rear housing 4, the second portion 84b of the retaining member 84 is configured to extend in the left-right direction of the rear housing 4, and the retaining member 84 is formed in a T-shape by the first portion 84a and the second portion 84b. With this configuration, the retaining member 84 is formed in a T-shape extending in the up-down direction and the left-right direction, and thus it is possible to improve the strength against external forces in various directions applied to the speakers 8. For example, even when a force that twists the speaker 8 is applied around the first portion 84a as a twisting axis, the second portion 84b forming a T-shape can support the speaker 8.

In the first embodiment, the first portion 84a of the retaining member 84 has a U-shape in the cross-sectional view along the direction perpendicular to the longer direction of the first portion 84a, and the second portion 84b of the retaining member 84 has a U-shape in the cross-sectional view along the direction perpendicular to the longer direction of the second portion 84b. With this configuration, the strength of the first portion 84a and the second portion 84b can be improved, and thus the strength of the entire retaining member 84 can be further improved.

In the first embodiment, the beam portion 41 is further comprised that is provided on the rear side of the rear housing 4 and to which the second portion 84b is fixed. With this configuration, by providing the beam portion 41 in the rear housing 4, each of the speakers 8 can be firmly fixed to the beam portion 41 (the rear housing 4) via the retaining member 84 while the rigidity is increased by the beam portion 41 even when the thickness of the liquid crystal television device 100 in the front-rear direction is small.

In the first embodiment, the second portion 84b is fixed so as to sandwich the beam portion 41. With this configuration, the second portion 84b can be fixed more firmly to the beam portion 41 by attaching the second portion 84b so as to sandwich the beam portion 41, and thus it is possible to effectively suppress the fixed state of the second portion 84b from being released when the vibration is applied.

In the first embodiment, the first cover member 82 is configured such that different second cover members 83 of different sizes are attachable. With this configuration, for example, by changing the position to which the retaining member 84 of the first cover member 82 is attached and the size of the second cover member 83, the first cover member 82 and the retaining member 84 can be made common even for different liquid crystal television devices 100 having different lengths in the up-down direction or the left-right direction, and thus the number of types of parts can be reduced.

In the first embodiment, the substrate 6 is further comprised that is attached to the rear housing 4, and the retaining member 84 has the wiring mounting portions 84e for fixing the wiring 9 connecting the substrate 6 to the speaker main body 81. With this configuration, when an external pulling force is applied to the speaker 8, the wiring 9 can be suppressed from being pulled, and thus the wiring 9 can be prevented from being disconnected.

In the first embodiment, the retaining member 84 has the mounting portion 84f for attaching the liquid crystal television device 100 to the wall surface. With this configuration, the liquid crystal television device 100 can be attached to the wall surface by the mounting portion 84f.

Second Embodiment

Referring to FIGS. 1 to 14, the configuration of a pair of speakers 8 of a liquid crystal television device 200 according to a second embodiment will be described. In view of the similarity between the first and second embodiments, the parts of the second embodiment that are similar or identical to the parts of the first embodiment will be given the same reference numerals as the parts of the first embodiment. Moreover, the descriptions of the parts of the second embodiment that are similar or identical to the parts of the first embodiment may be omitted for the sake of brevity. In the second embodiment, unlike the first embodiment, the first cover member 82 has an adjustment mechanism for adjusting the position for attaching the retaining member 84.

Figure 13:
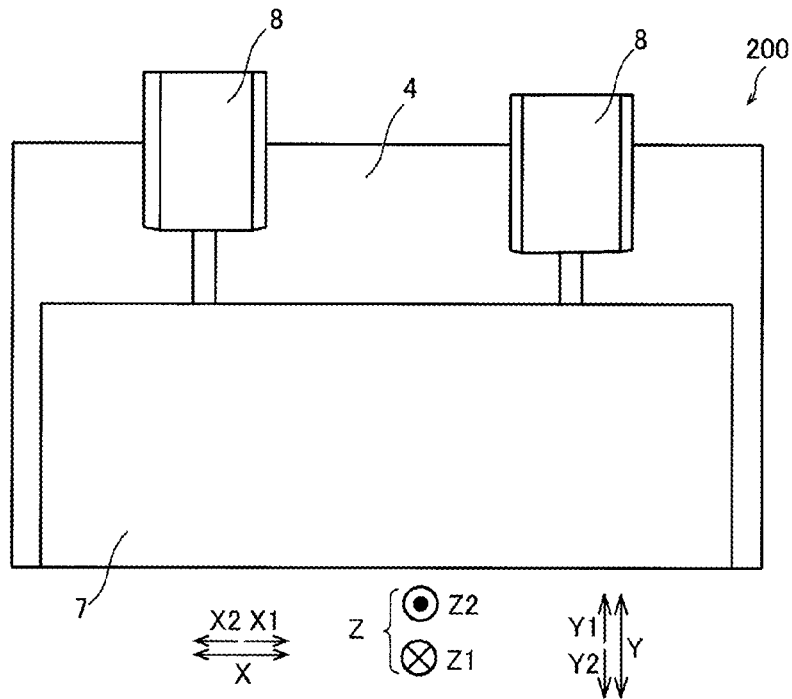
FIG. 13 is a rear view of a liquid crystal television device according to a second embodiment.
Figure 14:
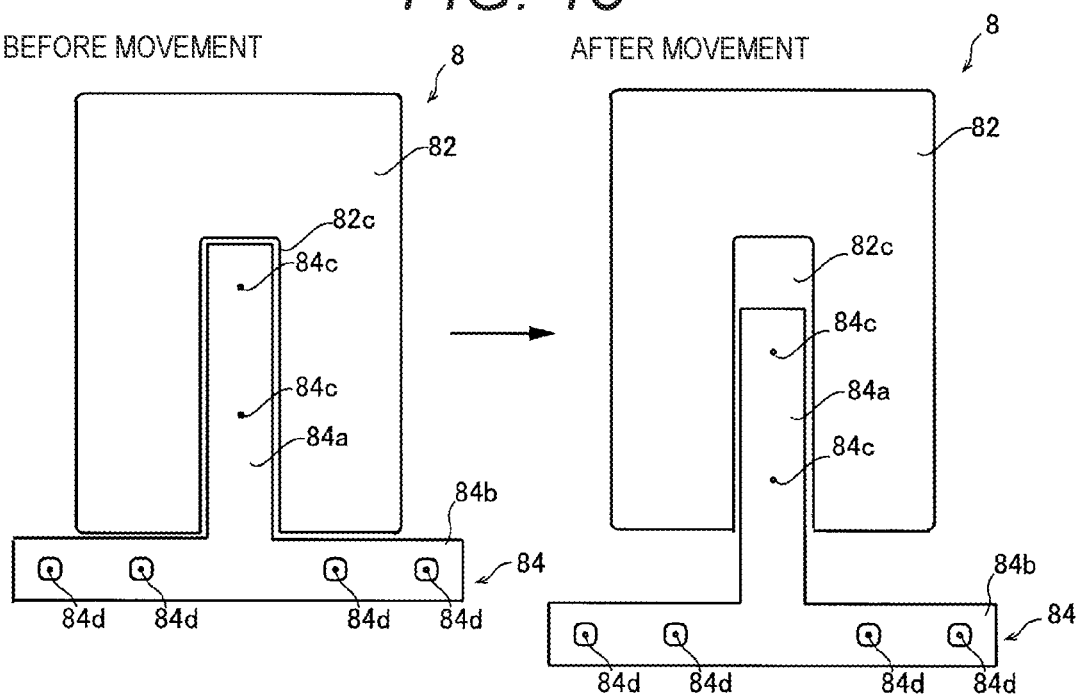
FIG. 14 is a diagram for explaining a movement mechanism.

As shown in FIGS. 13 and 14, in the second embodiment, the positions for attaching the speakers 8 to the rear housing 4 can be adjusted. The first cover member 82 of each of the speakers 8 has a groove 82c for the retaining member 84 to move in the up-down direction (the Y direction) therewithin. The groove 82c has the length in the X direction greater than the length of the first portion 84a of the retaining member 84 in the X direction. An attachment for moving along the groove 82c is provided to the tip of the first portion 84a of the retaining member 84. FIG. 14 shows a state before movement on the left side and a state after movement on the right side. FIG. 14 shows a state in which the second cover member 83 is removed, and the speaker main body 81 is omitted. As shown in FIG. 14, from the state before movement on the left side, each of the speakers 8 is moved in the Y direction by grasping the first cover member 82 or the second cover member 83 to change the position of each of the speakers 8. Then, it is fixed to the rear housing 4 by the magnet 85 (see FIG. 4). The groove 82c is an example of the "adjustment mechanism" in the claims.

The other configuration of the second embodiment is the same as the first embodiment above.

Effect of Second Embodiment

In the second embodiment, as in the first embodiment above, each of the speakers 8 includes the magnet 85 attached to the outer surface 82a of the first cover member 82 and fixing each of the speakers 8 to the rear housing 4. With this configuration, each of the speakers 8 can be fixed to the rear housing 4 of the liquid crystal television device 200 by the magnet 85, and thus the number of screw fixing points can be reduced compared to the case in which the speakers 8 are fixed only by screws, and each of the speakers 8 can be fixed to the rear housing 4 by magnetic force. In addition, each of the speakers 8 includes the retaining member 84 that is fixed to the rear housing 4 by the fastening members 10. With this configuration, the speakers 8 can be fixed to the liquid crystal television device 200 by the fastening members 10 as well. As a result, it is possible to reduce the number of screw fixing points, and to firmly fix the speakers 8 to the liquid crystal television device 200.

In the second embodiment, as described above, the first cover member 82 has the adjustment mechanism for adjusting the position for attaching the retaining member 84. With this configuration, by adjusting the position for attaching the retaining member 84, the length from the upper end of the first cover member 82 to the lower end of the exposed portion of the retaining member 84 can be adjusted, and thus the position for attaching each of the speakers 8 can be adjusted.

The other effects of the second embodiment are the same as those of the first embodiment.

MODIFICATION EXAMPLES

The embodiments disclosed here are illustrative and are not restrictive in all respects. The scope of the invention is indicated by the claims rather than by the description of the embodiments described above, and furthermore includes all modifications (modification examples) within the meaning and scope of the claims and their equivalents.

For example, in the first and second embodiments above, an example is shown in which the light source 2 is located on the side of the display unit 1, but the present invention is not limited to this. For example, the light source may be disposed on the rear side of the display unit.

In the first and second embodiments above, an example is shown in which two speakers 8 are attached to the liquid crystal television device 100 (200) (the display device), but the present invention is not limited to this. For example, the number of speakers 8 attached to the display device may be one, or three or more.

In the first and second embodiments above, an example is shown in which the speakers 8 output sound from the upper side, but the present invention is not limited to this. For example, the speakers 8 may output sound from the rear side (the Z2 side).

In the first and second embodiments above, an example is shown in which the first cover member 82 is in the form of a flat plate and is attached to the second cover member 83, but the present invention is not limited to this. For example, the second cover member 83 may be in the form of a flat plate and be attached to the first cover member 82.

In the first and second embodiments above, an example is shown in which the first cover member 82 is made of resin, but the present invention is not limited to this. For example, the first cover member 82 may be made of metal such that the magnet 85 may be directly attached thereto.

In the first and second embodiments above, an example is shown in which the magnet 85 is directly attached to the rear housing 4, but the present invention is not limited to this. For example, a buffer member that absorbs vibration may be disposed between the magnet 85 and the rear housing 4.

In the first and second embodiments above, an example is shown in which the magnet 85 is directly attached to the first cover member 82, but the present invention is not limited to this. For example, a buffer member that absorbs vibration may be disposed between the magnet 85 and the first cover member 82.

In the first and second embodiments above, an example is shown in which the rear cover 7 is attached to a part of the rear housing 4, but the present invention is not limited to this. For example, the rear cover 7 may be provided on the entire rear housing 4. In that case, the rear cover 7 may be provided between the magnet 85 and the rear housing 4, and the rear cover 7 may cover the second cover member 83 of each of the speakers 8 such that only the top surface of each of the speakers 8 is exposed.

In the first and second embodiments above, an example is shown in which the second cover member 83 is trapezoidal as viewed from the Y1 side, but the present invention is not limited to this. For example, the second cover member 83 may be rectangular in shape as viewed from the Y1 side.

In the first and second embodiments above, an example is shown in which the number of the plurality of first holes 84c provided in the first portion 84a of the retaining member 84 is less than the number of the mounting portions 82b provided in the first cover member 82, but the present invention is not limited to this. For example, the number of the plurality of first holes 84c provided in the first portion 84a may be greater than or equal to the number of the mounting portions 82b provided in the first cover member 82.

In the first and second embodiments above, an example is shown in which the retaining member 84 has a T-shape, but the present invention is not limited to this. For example, the retaining member 84 may have a cruciform shape.

In the first and second embodiments above, an example is shown in which the first portion 84a of the retaining member 84 has a U-shape in the cross-sectional view along the direction perpendicular to the longer direction, and the second portion 84b of the retaining member 84 has a U-shape in the cross-sectional view along the direction perpendicular to the longer direction, but the present invention is not limited to this. For example, any one of the first portion 84a and the second portion 84b of the retaining member 84 may have a U-shape in a cross-sectional view along a direction perpendicular to a longer direction, and none of them may have a U-shape in a cross-sectional view along a direction perpendicular to a longer direction.

In the first and second embodiments above, an example is shown in which the rear housing 4 is provided with the beam portion 41, but the present invention is not limited to this. For example, the rear housing 4 may not be provided with a beam portion 41. In this case, the second portion 84b of the retaining member 84 may be fixed directly to the rear of the rear housing 4.

In the first and second embodiments above, an example is shown in which each of the speakers 8 is provided with the wiring 9 that connects to the substrate 6, but the present invention is not limited to this. For example, the speaker main body 81 may be equipped with a circuit board and configured to communicate with the substrate 6 of the display device.

In the first and second embodiments above, the speakers 8 are explained as components of the liquid crystal television device 100 (200) (the display device), but the present invention is not limited to this. The speakers of the present invention may be speakers for a display device that can be retrofitted to the display device.

In the first and second embodiments above, an example is shown in which each of the speakers 8 is formed by attaching the retaining member 84, the speaker main body 81, and the second cover member 83 to the first cover member 82 in this order, but the present invention is not limited to this. For example, each of the speakers of the present invention may be formed by attaching the speaker main body 81 and the first cover member 82 to which the retaining member 84 is attached to the second cover member 83, or by attaching the speaker main body 81, the retaining member 84, and the first cover member 82 to the second cover member 83 in this order.

Figure 15:
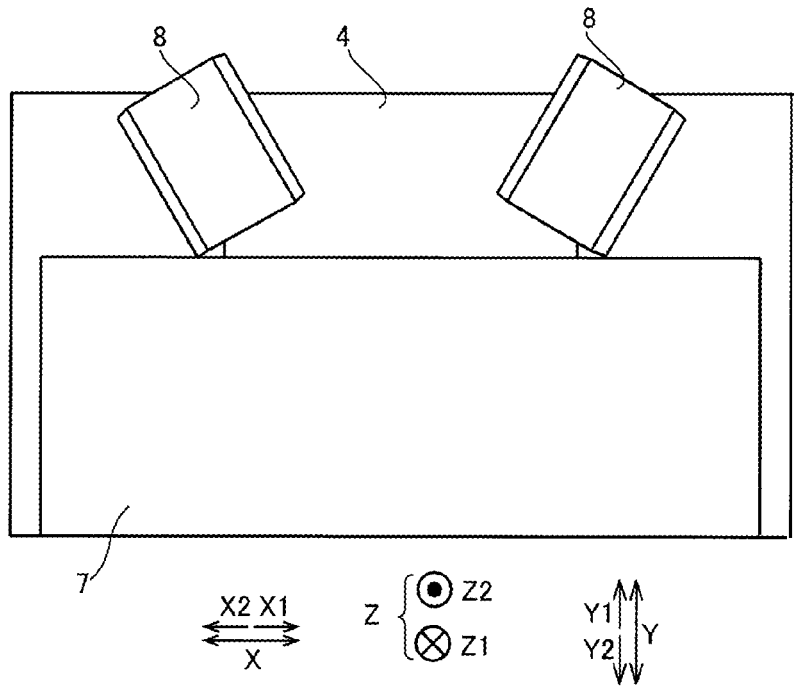
FIG. 15 is a rear view of a liquid crystal television device according to a modification example.
Figure 16:
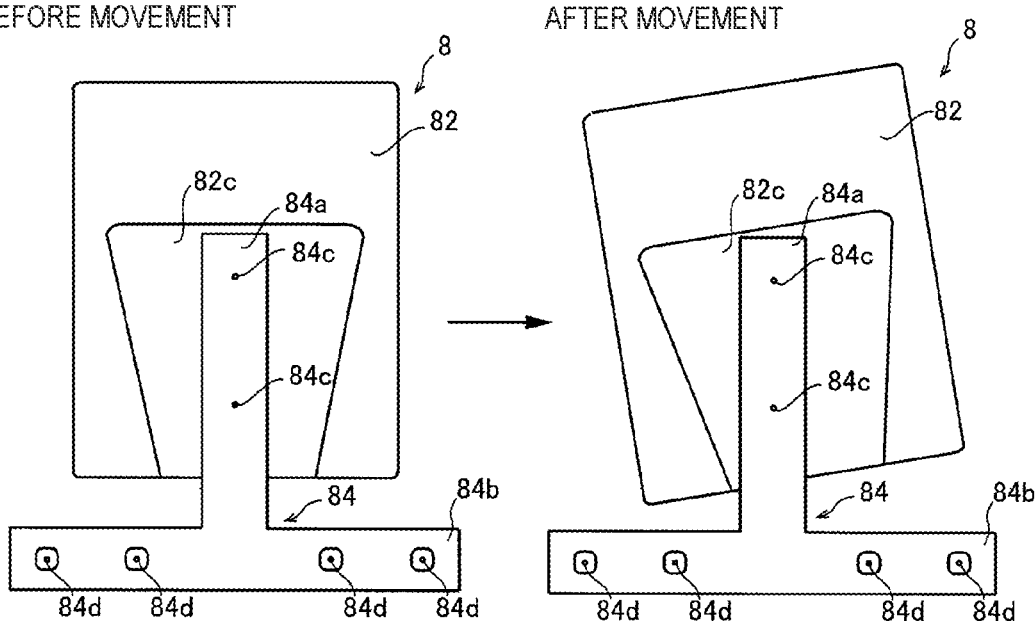
FIG. 16 is a diagram for explaining a movement mechanism according to the modification example.

In the second embodiment above, an example is shown in which each of the speakers 8 is movable in the up-down direction and is provided with the groove 82c (the adjustment mechanism) for moving in the up-down direction, but the present invention is not limited to this. For example, each of the speakers 8 may be pivoted about an axis along the Z direction, as shown in FIGS. 15 and 16. In this case, as shown in FIG. 16, the groove 82c (the adjustment mechanism) provided on the first cover member 82 may be fan-shaped, and each of the speakers 8 is pivotable from an original state on the left side to an inclined state on the right side. Thus, the first cover member 82 is movably coupled to the retaining member 84. In FIG. 15, the second cover member 83 and the speaker main body 81 are omitted. With this configuration, the speakers 8 can be moved in the left-right direction according to the user's preference while reducing the number of screw fixing points by the first cover member 82 being equipped with the magnet 85.

Figure 17:
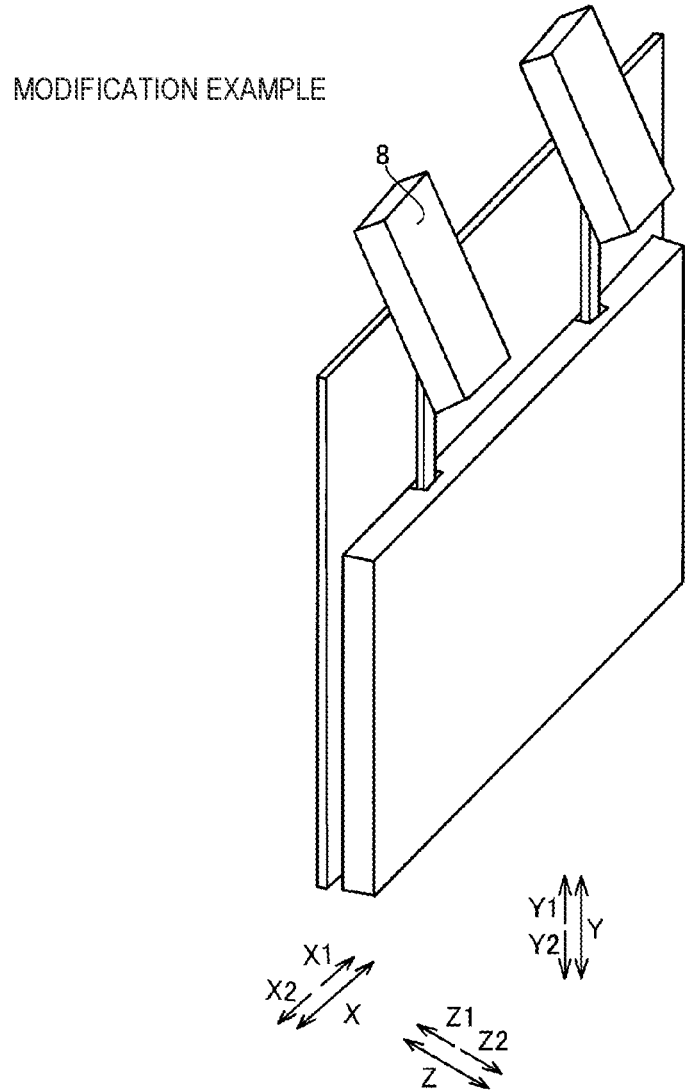
FIG. 17 is a perspective view of a liquid crystal television device according to another modification example.

In the second embodiment above, an example is shown in which the adjustment mechanism includes the groove 82c (the adjustment mechanism) for each of the speakers 8 to move in the up-down direction, but the present invention is not limited to this. For example, the speakers 8 are movable or tiltable in the front-rear direction, as shown in FIG. 17. In particular, the first cover member 82 of each of the speakers 8 is movably coupled to the retaining member 84 of each of the speakers 8, for example. In this case, each of the speakers 8 is movable or tiltable in the front-rear direction by increasing the length or size of the opening 86 (see FIG. 7) that is formed on the Y2 side of each of the speakers 8 in the Z direction. In this case, the opening 86 is an example of the adjustment mechanism. With this configuration, the speakers 8 can be moved in the front-rear direction according to the user's preference while reducing the number of screw fixing points by the first cover member 82 being equipped with the magnet 85.

(1) In view of the state of the known technology and in accordance with a first aspect of the present invention, a display device comprises a display unit having a display surface on which an image is displayed, a light source that irradiates light onto the display unit, a rear housing attached to an opposite side of the display unit from the display surface, a rear cover that covers a part of the rear housing, and a speaker attached to the rear housing, the speaker including a speaker main body, a first cover member to which the speaker main body is attached and having an outer surface facing the rear housing, a second cover member disposed so as to face the first cover member across the speaker main body, a retaining member disposed between the speaker main body and the first cover member and fixed to the rear housing by a fastening member, and a magnet attached to the outer surface of the first cover member and fixing the speaker main body to the rear housing.

In the display device according to the first aspect, as described above, the speaker includes the magnet attached to the outer surface of the first cover member and fixing the speaker to the rear housing. With this configuration, the speaker can be fixed to the rear housing of the display device by the magnet, and thus the number of screw fixing points can be reduced compared to the case in which the speaker is fixed only by screws, and the speaker can also be fixed to the rear housing by magnetic force. In addition, the speaker includes the retaining member that is fixed to the rear housing by the fastening member. With this configuration, the speaker can be fixed to the display device by the fastening member as well. As a result, it is possible to reduce the number of screw fixing points, and to firmly fix the speaker to the display device.

(2) In accordance with a preferred embodiment according to the display device mentioned above, the magnet is disposed at an upper end side of the speaker and fixed to the rear housing, and the retaining member is exposed from the first cover member at a lower end side of the speaker and is fixed to the rear housing by the fastening member. With this configuration, both the upper end side and the lower end side of the speaker can be fixed to the rear housing such that the upper end side of the speaker is fixed to the rear housing by the magnet and the lower end side of the speaker is fixed to the rear housing by the retaining member, and thus, compared to a case in which only one of the upper end side and the lower end side is fixed, it is possible to suppress the vibration of the other one. As a result, it is possible to suppress the generation of noise (so called "chatter") due to the vibration of the speaker.

(3) In accordance with a preferred embodiment according to any one of the display devices mentioned above, the retaining member has a first portion that is attached to the first cover member and a second portion that is attached to the rear housing, and the second portion is covered by the rear cover while being attached to the rear housing. With this configuration, the second portion is covered by the rear cover, and thus it is possible to prevent the fastening member from being unintentionally loosened by external contact.

(4) In accordance with a preferred embodiment according to any one of the display devices mentioned above, the first portion of the retaining member extends in an up-down direction of the rear housing, the second portion of the retaining member extends in a left-right direction of the rear housing, and the retaining member is formed in a T-shape by the first portion and the second portion. With this configuration, the retaining member is formed in a T-shape extending in the up-down direction and the left-right direction, and thus it is possible to improve the strength against external forces in various directions applied to the speaker. For example, even when a force that twists the speaker is applied around the first portion as an axis, the second portion forming a T-shape can support the speaker.

(5) In accordance with a preferred embodiment according to any one of the display devices mentioned above, in the case in which the retaining member above is formed in a T-shape by the first portion and the second portion, the first portion of the retaining member has a U-shape in a cross-sectional view along a direction perpendicular to a longer direction of the first portion, and the second portion of the retaining member has a U-shape in a cross-sectional view along a direction perpendicular to a longer direction of the second portion. With this configuration, the strength of the first portion and the second portion can be improved, and thus the strength of the entire retaining member can be further improved.

(6) In accordance with a preferred embodiment according to any one of the display devices mentioned above, the first portion of the retaining member is fixedly attached to the first cover member by a fastening member.

(7) In accordance with a preferred embodiment according to any one of the display devices mentioned above, the first portion of the retaining member has at least one hole, and the first cover member has at least one mounting portion that is positioned relative to the at least one hole of the first portion of the retaining member.

(8) In accordance with a preferred embodiment according to any one of the display devices mentioned above, in the case in which the retaining member above is formed in a T-shape by the first portion and the second portion, a beam portion is further comprised that is provided on a rear of the rear housing and to which the second portion is fixed. With this configuration, by providing the beam portion in the rear housing, the speaker can be firmly fixed to the beam portion (the rear housing) via the retaining member while the rigidity is increased by the beam portion even when the thickness of the display device in a front-rear direction is small.

(9) In accordance with a preferred embodiment according to any one of the display devices mentioned above, the second portion is fixed so as to sandwich the beam portion. With this configuration, the second portion can be fixed more firmly to the beam portion by attaching the second portion so as to sandwich the beam portion, and thus it is possible to effectively suppress a fixed state of the second portion from being released when the vibration is applied.

(10) In accordance with a preferred embodiment according to any one of the display devices mentioned above, the beam portion extends on the rear of the rear housing in a left-right direction of the rear housing.

(11) In accordance with a preferred embodiment according to any one of the display devices mentioned above, the first cover member is configured such that second cover members of different sizes are attachable thereto. With this configuration, for example, by changing the position to which the retaining member of the first cover member is attached and the size of the second cover member, the first cover member and the retaining member can be made common even for display devices having different lengths in the up-down direction or the left-right direction, and thus the number of types of parts can be reduced.

(12) In accordance with a preferred embodiment according to any one of the display devices mentioned above, a substrate is further comprised that is attached to the rear housing, and the retaining member has a wiring mounting portion for fixing the wiring connecting the substrate and the speaker main body. With this configuration, when an external pulling force is applied to the speaker, the wiring can be suppressed from being pulled, and thus the wiring can be prevented from being disconnected.

(13) In accordance with a preferred embodiment according to any one of the display devices mentioned above, the retaining member has a mounting portion for attaching the display device to a wall surface. With this configuration, the display device can be attached to the wall surface by the mounting portion.

(14) In accordance with a preferred embodiment according to any one of the display devices mentioned above, the first cover member has an adjustment mechanism for adjusting a position for attaching the retaining member. With this configuration, by adjusting the position for attaching the retaining member, the length from the upper end of the first cover member to a lower end of an exposed portion of the retaining member can be adjusted, and thus the position for attaching the speaker can be adjusted.

(15) In view of the state of the known technology and in accordance with a second aspect of the present invention, a speaker for a display device comprises a speaker main body, a first cover member to which the speaker main body is attached and having an outer surface facing a rear of the display device, a second cover member disposed so as to face the first cover member across the speaker main body, a retaining member disposed between the speaker main body and the first cover member and fixed to the display device by a fastening member, and a magnet attached to the outer surface of the first cover member and fixing the speaker main body to the display device.

The speaker for the display device according to the second aspect includes the magnet attached to the outer surface of the first cover member and fixing the speaker main body to the display device, as described above. With this configuration, the speaker can be fixed to the display device by the magnet, and thus the number of screw fixing points can be reduced compared to a case in which the speaker is fixed only by screws, and the speaker can also be fixed to the display device by magnetic force. In addition, the speaker includes the retaining member that is fixed to the display device by the fastening member, and thus the speaker can be fixed to the display device by the fastening member as well. As a result, it is possible to reduce the number of screw fixing points, and to firmly fix the speaker to the display device.

(16) In accordance with a preferred embodiment according to any one of the display devices mentioned above, the rear housing is made of metal, and the speaker is fixedly attached to the rear housing by magnetic force of the magnet.

(17) In accordance with a preferred embodiment according to any one of the display devices mentioned above, the retaining member has a first portion that is fixedly attached to the first cover member and a second portion that is fixedly attached to the rear housing, the first portion and the second portion being integrated or fixedly coupled with respect to each other.

(18) In accordance with a preferred embodiment according to any one of the display devices mentioned above, the first portion and the second portion of the retaining member are made of metal.

(19) In accordance with a preferred embodiment according to any one of the display devices mentioned above, the number of the at least one hole of the first portion of the retaining member is smaller than the number of the at least one mounting portion of the first cover member.

(20) In accordance with a preferred embodiment according to any one of the display devices mentioned above, the first cover member is movably coupled to the retaining member.

According to the present disclosure, it is possible to provide a display device and a speaker that can reduce the number of screw fixing points and can firmly fix the speaker to the display device.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position on a horizontal surface. The terms "left" and "right" are used to indicate the "right" when referencing from the right side as viewed from the rear of the display device, and the "left" when referencing from the left side as viewed from the rear of the display device.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
    a display unit having a display surface on which an image is displayed;
    a light source that irradiates light onto the display unit;
    a rear housing attached to an opposite side of the display unit from the display surface;
    a rear cover that covers a part of the rear housing; and
    a speaker attached to the rear housing,
    the speaker including
        a speaker main body,
        a first cover member to which the speaker main body is attached and having an outer surface facing the rear housing,
        a second cover member disposed so as to face the first cover member across the speaker main body,
        a retaining member disposed between the speaker main body and the first cover member and fixed to the rear housing by a fastening member, and
        a magnet attached to the outer surface of the first cover member and fixing the speaker main body to the rear housing.

2. The display device according to claim 1, wherein
    the magnet is disposed at an upper end side of the speaker and fixed to the rear housing, and
    the retaining member is exposed from the first cover member at a lower end side of the speaker and is fixed to the rear housing by the fastening member.

3. The display device according to claim 1, wherein
    the retaining member has a first portion that is attached to the first cover member and a second portion that is attached to the rear housing, and
    the second portion is covered by the rear cover while being attached to the rear housing.

4. The display device according to claim 3, wherein
    the first portion of the retaining member extends in an up-down direction of the rear housing, and the second portion of the retaining member extends in a left-right direction of the rear housing, and
    the retaining member is formed in a T-shape by the first portion and the second portion.

5. The display device according to claim 3, wherein
    the first portion of the retaining member has a U-shape in a cross-sectional view along a direction perpendicular to a longer direction of the first portion, and
    the second portion of the retaining member has a U-shape in a cross-sectional view along a direction perpendicular to a longer direction of the second portion.

6. The display device according to claim 3, wherein
    the first portion of the retaining member is fixedly attached to the first cover member by a fastening member.

7. The display device according to claim 3, wherein
    the first portion of the retaining member has at least one hole, and the first cover member has at least one mounting portion that is at least partially positioned relative to the at least one hole of the first portion of the retaining member.

8. The display device according to claim 3, further comprising
a beam portion provided on a rear of the rear housing and to which the second portion is fixed.

9. The display device according to claim 8, wherein
the second portion is fixed so as to sandwich the beam portion.

10. The display device according to claim 8, wherein
the beam portion extends on the rear of the rear housing in a left-right direction of the rear housing.

11. The display device according to claim 1, wherein
the first cover member is configured such that second cover members of different sizes are attachable thereto.

12. The display device according to claim 1, further comprising
a substrate attached to the rear housing,
the retaining member having a wiring mounting portion for fixing a wiring connecting the substrate to the speaker main body.

13. The display device according to claim 1, wherein
the retaining member has a mounting portion for attaching the display device to a wall surface.

14. The display device according to claim 1, wherein
the first cover member has an adjustment mechanism for adjusting a position for attaching the retaining member.

15. A speaker for a display device, comprising:
a speaker main body;
a first cover member to which the speaker main body is attached and having an outer surface facing a rear of the display device;
a second cover member disposed so as to face the first cover member across the speaker main body;
a retaining member disposed between the speaker main body and the first cover member and fixed to the display device by a fastening member; and
a magnet attached to the outer surface of the first cover member and fixing the speaker main body to the display device.

16. The display device according to claim 1, wherein
the rear housing is made of metal, and
the speaker is fixedly attached to the rear housing by magnetic force of the magnet.

17. The display device according to claim 1, wherein
the retaining member has a first portion that is fixedly attached to the first cover member and a second portion that is fixedly attached to the rear housing, the first portion and the second portion being integrated or fixedly coupled with respect to each other.

18. The display device according to claim 17, wherein
the first portion and the second portion of the retaining member are made of metal.

19. The display device according to claim 7, wherein
the number of the at least one hole of the first portion of the retaining member is smaller than the number of the at least one mounting portion of the first cover member.

20. The display device according to claim 1, wherein
the first cover member is movably coupled to the retaining member.

* * * * *